July 14, 1925.  
O. MUNK  
STEAM DRIVEN LOCOMOTIVE  
Filed Aug. 7, 1924

1,546,248

Inventor:  
Otto Munk  
by J. J. Such,  
attorney.

Patented July 14, 1925.

1,546,248

UNITED STATES PATENT OFFICE.

OTTO MUNK, OF WILDAU, GERMANY, ASSIGNOR TO BERLINER MASCHINENBAU-ACTIEN-GESELLSCHAFT VORMALS L. SCHWARTZKOPFF OF BERLIN, A CORPORATION OF PRUSSIA, GERMANY.

STEAM-DRIVEN LOCOMOTIVE.

Application filed August 7, 1924. Serial No. 730,640.

*To all whom it may concern:*

Be it known that I, OTTO MUNK, engineer, a citizen of the German Republic, residing at 2 Eichstrasse, Wildau, Germany, have invented new and useful Improvements in or Relating to a Steam-Driven Locomotive, of which the following is a specification.

The present invention relates to steam-driven locomotives, more particularly intended for travelling over defective tracks laid on bad ground.

The invention is mainly concerned with crop-collecting locomotives, for example those used on sugar beet fields on which the track is laid in accordance with the progress of the crop. These tracks are out of alignment and uneven in all directions firstly because of the rough nature of the ground and secondly because of the rudimentary rail connections due to the necessity of laying the track in the simplest possible way. The locomotive according to the present invention is suitable for performing work in the best way on such defective tracks. To this end, the locomotive is fitted with pivoted frames entirely independent of the main frame of the machine. The pivoted frames are connected to the said main frame in the usual way by means of a spherical pivot attachment and carry the steam cylinders. Flexible piping is used according to the invention to supply the cylinders with steam, so that the pivoted frames may move entirely independently of the main frame. The valve-controlling gear is also arranged so that the connection between elements of the said gear on the pivoted frames and elements thereof on the main frame is in the vicinity of the pivot members and lie in the same vertical axis as the said members.

Locomotives of this kind are usually rather small and are liable to overturn. The invention therefore also provides that in this case the valve-operating and driving elements are protected from damage, so that the said elements are all within the wheels and the frame, the locomotive being driven in the simplest manner by means of a transmission shaft and chain drive. The pivoted frames are entirely alike and therefore interchangeable, so that one pivoted frame only need be stocked as a spare.

Figure 1:
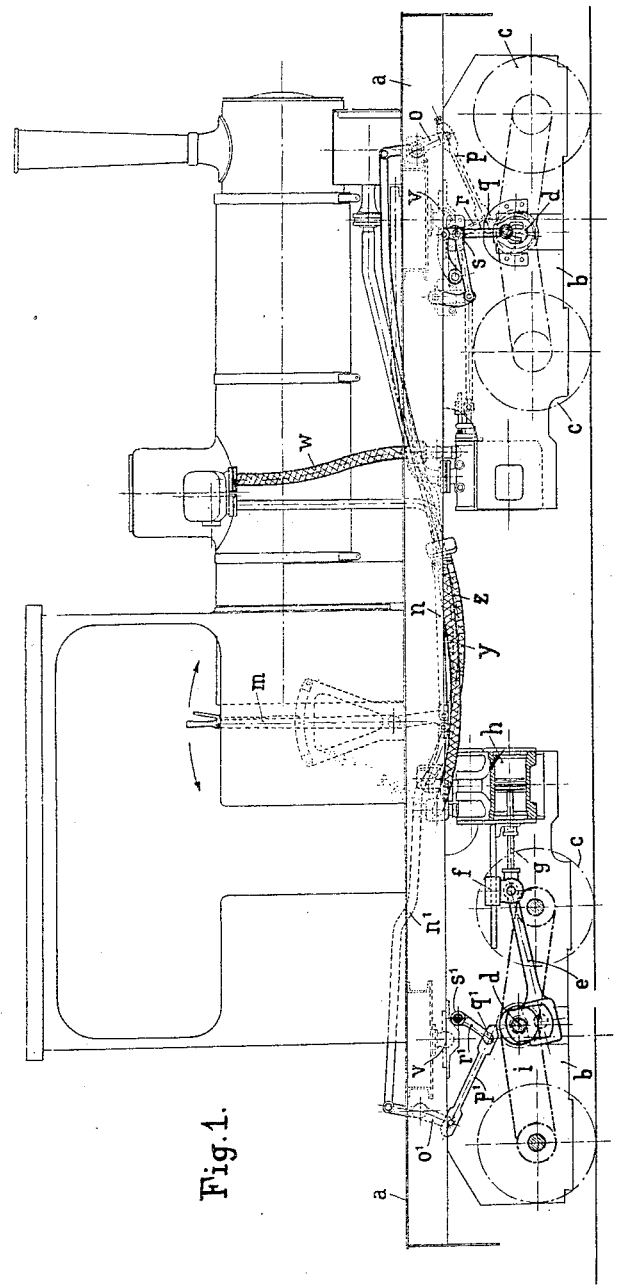
Figure 2:
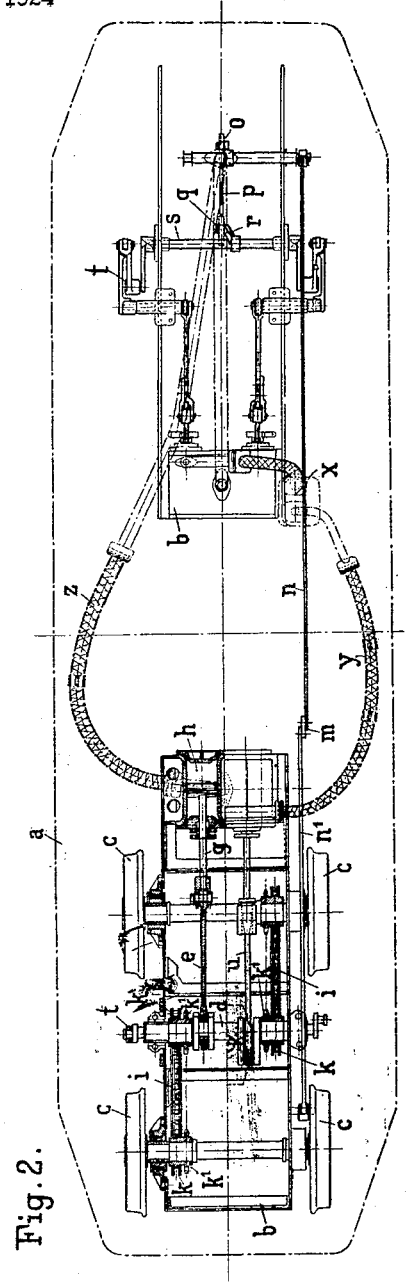

A constructional example of the locomotive according to this invention is illustrated in the accompanying drawings in which, Figure 1 is a diagrammatic side elevation, partly in section, of the locomotive and Figure 2 is a diagrammatic plan thereof, also partly in section.

The locomotive or main frame $a$, the boiler, the driver's cabin and so forth may be of any convenient type. In the construction illustrated the main frame rests on two pivoted frames $b$ each provided with two pairs of wheels $c$ and a transmission shaft $d$ having two cranks and connected to the two power cylinders $h$ through the connecting rods $e$, the cross-head $f$ and the piston rod $g$. The two axles on the pivoted frame are driven off the transmission shaft by chains $i$. The transmission shaft and the axles are each fitted with two sets of sprocket teeth $k$ and $k^1$ so that when one set is worn the other may be used straightaway without having first to dismantle the axle or the transmission shaft for replacing the worn teeth. As may be seen more particularly from Figure 2, left hand side half, the whole of the driving means is entirely within the pivoted frame.

The attendant drives the locomotive from the footplate by means of the lever $m$ to the lower end of which are pivoted two links $n$ and $n^1$ connected to rods $p$ and $p^1$ by means of double-armed levers $o$ and $o^1$. The other end of the levers $p$ and $p^1$ is connected to the valve-operating elements of the pivoted frames by means of spherical pivots $q$ and $q^1$, the said rods being attached to lever arms $r$ and $r'$ mounted on shafts $s$ and $s^1$ lying right across the pivoted frames. The valve mechanism is operated from these shafts; the said mechanism is shown on the right hand side of Figures 1 and 2 and needs no further description as it is of any desired type. It is essential, however, as shown in the left hand side of Figure 2, that the outermost elements of the valve-operating gear $t$ should not project beyond the outer edge of the wheels and be fully protected.

The valve-operating gear is driven off the shafts $d$ through the connecting rod $u$. The operation of the valves is thus greatly simplified and rendered much safer since it is unaffected by any springing relatively to the frame. Moreover, the valves may be operated without any interference by the relative movements of the pivoted frames to the main frame, whether the said pivoted frame move about the longitudinal or transverse axis of the locomotive, because the spherical pivots $q$ and $q^1$ (through which the valve-operating elements on the main frame are connected to those on the pivoted frames) lie in the vicinity and in the vertical plane of the spherical pivots $v$ of the pivoted frames.

Steam is supplied from the steam dome to the cylinders through flexible piping. The said dome is connected through hose $w$ to a pipe $x$ on the front pivoted frame. A flexible pipe $y$ is connected to the pipe $x$ and leads to the cylinders of the rear pivoted frame. Exhaust steam is led to the chimney through the flexible pipe $z$.

The two pivoted frames are entirely alike so that they may be interchanged without alteration, with the advantage that only one such frame need be kept as a spare, which may be used as a front or rear pivoted frame when one of them is damaged on the locomotive.

The constructional details of the locomotive may of course be altered, for example as regards the valve-operating gear and the lay-out of the steam piping. The essence of the invention is to render the locomotive fit for the purpose set forth by the connection of the means described whereby the pivoted frame is rendered entirely independent of the main or locomotive frame.

Having now particularly described and ascertained the nature of my invention and in what manner the same is to be performed, I declare that what I claim is:—

1. A steam driven locomotive, more particularly intended for traveling over defective tracks laid on bad ground, having in combination a main frame, valve-operating elements mounted on said frame, pivoted frames, pivot members having a vertical axis and connecting said main frame and pivoted frames, valve-operating elements mounted on the pivoted frames and means connecting said first mentioned valve-operating elements with said last mentioned valve-operating elements and being in the vicinity of and on the same vertical axis as the said pivot members.

2. A steam driven locomotive, more particularly intended for travelling over defective tracks laid on bad ground, having in combination a main frame, valve-operating elements mounted on said frame, pivoted frames, power cylinders, pivot members having a vertical axis and connecting said main frame and pivoted frames, valve-operating elements mounted on the pivoted frames, means connecting said first mentioned valve-operating elements with said last mentioned valve-operating elements and being in the vicinity of and on the same vertical axis as the said pivot members and a piping for supplying steam to the power cylinders allowing the pivoted frames to move freely in all directions relatively to the main frame.

3. A steam driven locomotive, more particularly intended for travelling over defective tracks laid on bad ground, having in combination a main frame, valve-operating elements mounted on said frame, pivoted frames, power cylinders, pivot members having a vertical axis and connecting said main frame and pivoted frames, valve-operating elements mounted on the pivoted frames, means connecting said first mentioned valve-operating elements with said last mentioned valve-operating elements and being in the vicinity of and on the same vertical axis as the said pivot members and a flexible piping for supplying steam to the power cylinders allowing the pivoted frames to move freely in all directions relatively to the main frame.

4. A steam driven locomotive, more particularly intended for travelling over defective tracks laid on bad ground, having in combination a main frame, pivoted frames, pivot members connecting said main frame and pivoted frames, power cylinders and wheel axles mounted on the pivoted frames, a transmission shaft, chain wheels and chains also mounted in each of the pivoted frames by means of which the driving power is transmitted from the cylinders to said axles, and a duplicate chain wheel for every chain wheel.

5. A steam driven locomotive, more particularly intended for travelling over defective tracks laid on bad ground, having in combination a main frame, valve-operating elements mounted on said frame, pivoted frames, pivot members having a vertical axis and connecting said main frame and pivoted frames, valve-operating elements, power cylinders, wheel axles and a transmission shaft mounted on each of the pivoted frames by means of which the driving power is transmitted from the cylinders to said axles and means connecting said first mentioned valve-operating elements with said last mentioned valve-operating elements and being in the vicinity of and on the same vertical axis as the said pivot members.

6. A steam driven locomotive, more particularly intended for travelling over defective tracks laid on bad ground, having in combination a main frame, pivoted frames, pivot members connecting said main frame and pivoted frames, power cylinders and wheel axles mounted on the pivoted frames, a controlling lever arranged in the driver's cabin on the main frame, a transverse shaft mounted on each of the pivoted frames, links and rods connecting said controlling lever and transverse shafts and valve controlling elements leading to the cylinders and connected to the ends of said transverse shafts.

7. A steam driven locomotive, more particularly intended for travelling over defective tracks laid on bad ground, having in combination a main frame, pivoted frames, pivot members connecting said main frame and pivoted frames, power cylinders and wheel axles mounted on the pivoted frames, a controlling lever arranged in the driver's cabin on the main frame, a transverse shaft mounted on each of the pivoted frames, links and rods connecting said controlling lever and transverse shafts and valve controlling elements leading to the cylinders and connected to the ends of said transverse shafts, every valve controlling element lying inside the other plane of the wheels.

8. A steam driven locomotive, more particularly intended for travelling over defective tracks laid on bad ground, having in combination a main frame, valve-operating elements mounted on said frame, pivoted frames, power cylinders, pivot members having a vertical axis and connecting said main frame and pivoted frames, valve-operating elements mounted on the pivoted frames, means connecting said first mentioned valve-operating elements with said last mentioned valve-operating elements and being in the vicinity of and on the same vertical axis as the said pivot members and a piping for supplying steam to the power cylinders allowing the pivoted frames to move freely in all directions relatively to the main frame, the pivoted frames being entirely alike and interchangeable.

In testimony whereof I have signed my name to this specification.

OTTO MUNK.